Sept. 12, 1933.    F. G. WELKE    1,926,414
HOSE NOZZLE
Filed Feb. 24, 1930
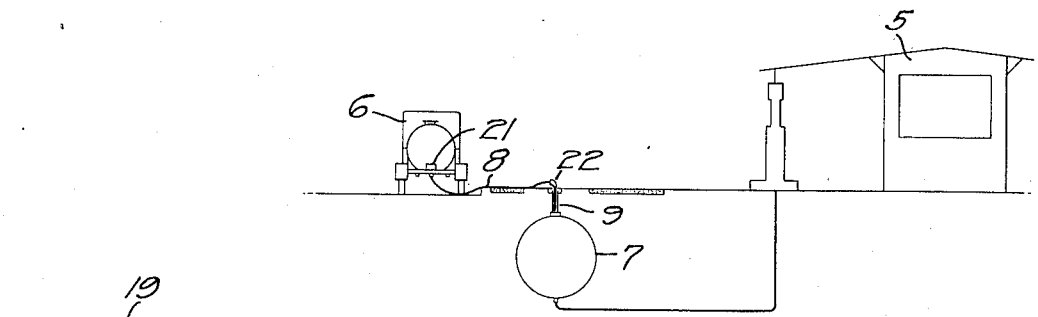
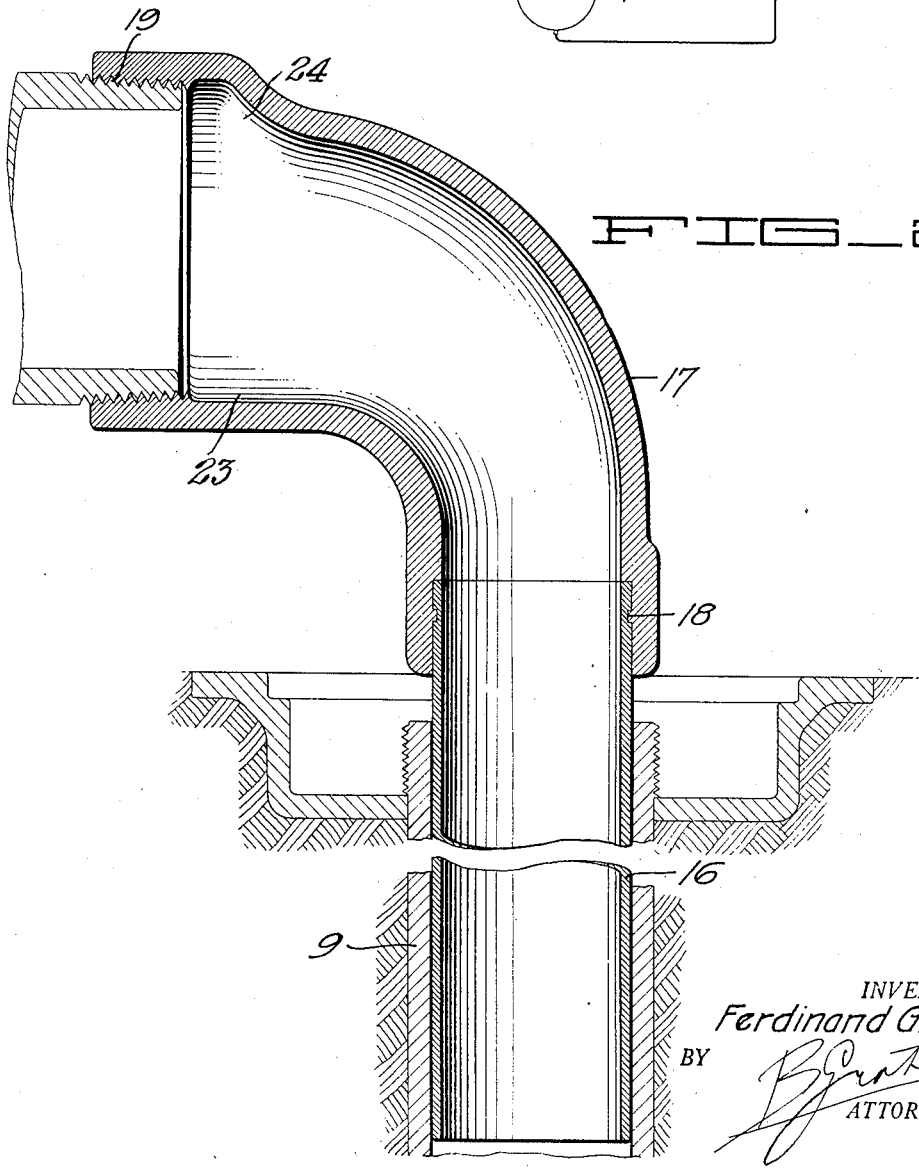
INVENTOR.
Ferdinand G. Welke
BY
ATTORNEY Patented Sept. 12, 1933

1,926,414

UNITED STATES PATENT OFFICE 1,926,414

HOSE NOZZLE

Ferdinand G. Welke, San Francisco, Calif.

Application February 24, 1930. Serial No. 430,848

2 Claims. (Cl. 221—100)

This invention relates to a hose nozzle particularly useful for discharging gasoline from a tank truck into the filler pipe of a service station tank.

It is an object of the invention to devise a hose nozzle which will facilitate and increase the discharge of petroleum products such as gasoline into a service station tank from a tank truck.

Another object of the invention is to devise a novel hose nozzle construction relatively simple and inexpensive of manufacture.

The invention possesses other advantageous features and objects, some of which with the foregoing will be set forth at length in the following description where I shall outline in full that form of hose nozzle of my invention which I have selected for illustration in the drawing accompanying and forming part of the present specification. In said drawing I have shown one form of hose nozzle embodying my invention, but it is to be understood that I do not limit myself to such form since the invention, as set forth in the claims, may be embodied in a plurality of forms.

Figure 1 is a schematic view illustrating the manner of employing the hose nozzle of my invention.

Figure 2 is a side elevational view in section of a form of hose nozzle embodying my invention.

Such petroleum products as gasoline are usually delivered to a service station 5 from a tank truck 6, the product being stored in an underground tank 7. The product is drawn from the tank truck through a flexible hose 8 and discharged into a tank filler pipe 9. The equipment employed in service stations has not been standardized to the extent that the filler pipes have uniform ends so that the hose may be attached directly to any one of them. This requires that a nozzle be provided capable of being inserted into the filler pipe. These pipes are usually uniform in size and of small extent, usually about an inch and a half in diameter.

Under the pressure of modern business it is a consideration to make the deliveries as rapidly as possible so that a truck may handle a large gallonage, since the investment in the trucks is considerable, and since the marketing of these products is a highly competitive business. I have found that the delivery of the material to the service station tank is facilitated by utilizing equipment having as large a discharge opening as is possible. Since the size of the filler pipe available in service stations is practically fixed at an inch and a half, this is usually the maximum external diameter of any nozzle employed for insertion into the pipe. It is not expedient to attempt to connect the hoze to the threaded end of the filler pipe since, as was previously pointed out, there are so many different types of filler pipes that numerous adapters and fittings would be required. I have found that it is possible to form a nozzle, for insertion into the filler pipe and having a tube of relatively slight extent so as to have an internal diameter substantially that of the filler pipe, by employing drawn tubing of a suitable material. The nature of the material is preferably such that it is not possible to cause a spark with it if it is struck against metal or stone. Such a material is brass.

To facilitate the connection of the tube to the hose I have successfully employed the construction illustrated in Figure 2 of the drawing. As is there shown, the tube 16 of relatively thin light brass was joined to an elbow 17. To overcome the difficulties attendant upon attempts to thread the tube into the elbow or to employ complicated mechanisms wherein a good deal of machining is necessary, I have devised the construction shown wherein I interlock the tube and the elbow. Thus, a groove 18 is formed in the tube and the metal of the elbow is within the groove so that an interlock is formed which prevents the tube from being disengaged from the elbow. This construction is usually secured by inserting the tube in the mold wherein the elbow is cast and allowing the metal to flow into the groove 18 so that when it cools the structure is formed integrally.

The elbow is joined to the hose through some convenient means as by providing screw threads 19 with which the hose may be joined. The passageway provided through the elbow is substantially that available in the tube for passage of the liquid so that no reduction in cross sectional area takes place through the discharge nozzle, thus facilitating to as great a degree as is possible under the restrictions imposed by the fixed size of filler pipe, the discharge from the tank truck. The underside of the casting as shown at 23 is in a straight line with the threaded section adjacent to it. It is not restricted as at 24, as is usual with threaded hose connections. By this construction it will be seen that the nozzle is virtually offset downward from the threaded section. This design of the nozzle prevents turbulence and thereby helps to increase the flow of liquid through the nozzle.

The length of the tube 16 can be any value desired although I prefer that it does not extend down into the liquid in the tank. A suitable length I have found to be fifty inches since this brings the nozzle down in the filler pipe for a goodly distance and materially increases the discharge from the tank truck. Thus, as is indicated in Figure 1, liquid discharged from the tank truck 6 passes through a meter indicated at 21 through the flexible hose 8 to which is joined the discharge nozzle of my invention indicated at 22. This nozzle extends for a goodly distance down into the filler pipe so that a greater siphoning effect is placed upon the contents of the tank because of the weight of the column of confined and falling gasoline. By utilizing a tube extending relatively close to the tank into which the liquid was to be discharged I have increased the rate of flow from 42 gallons per minute to about 70 gallons per minute, thus decreasing the time of delivery by 40%.

I claim:

1. A hose nozzle comprising an elbow, the threaded section of which is eccentrically offset from the remainder and a long tubular spout, having a wall of relatively thin material.

2. A hose nozzle comprising an elbow, the hose connecting section of which is eccentrically offset from the remainder and a long tubular spout having a wall of relatively thin material.

FERDINAND G. WELKE.